W. W. CAIN.
WIND WHEEL.
APPLICATION FILED NOV. 12, 1913.
1,127,400.
Patented Feb. 9, 1915.
2 SHEETS—SHEET 1.
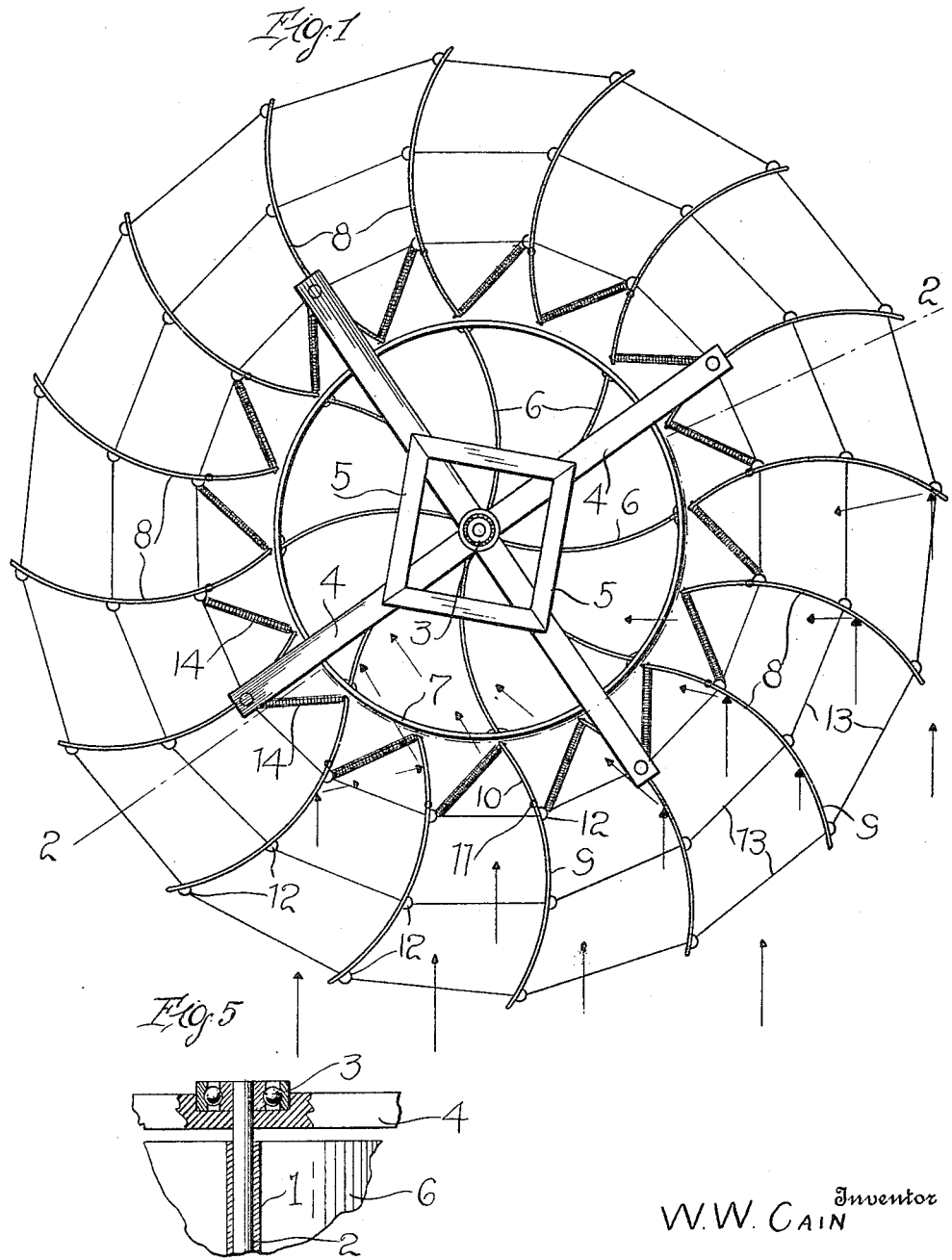
Witnesses
Robert M. Sutphen
A. L. Hind
Inventor
W. W. Cain
By Watson E. Coleman
Attorney

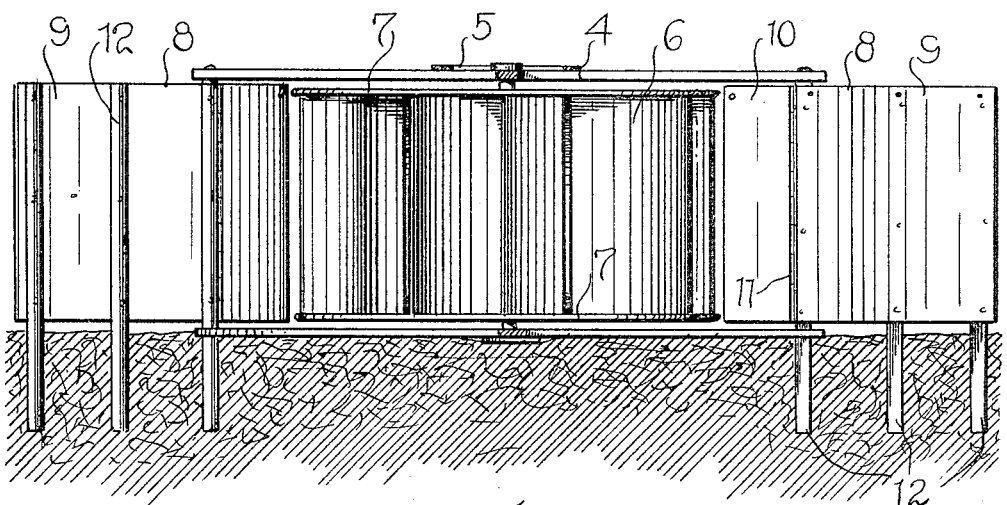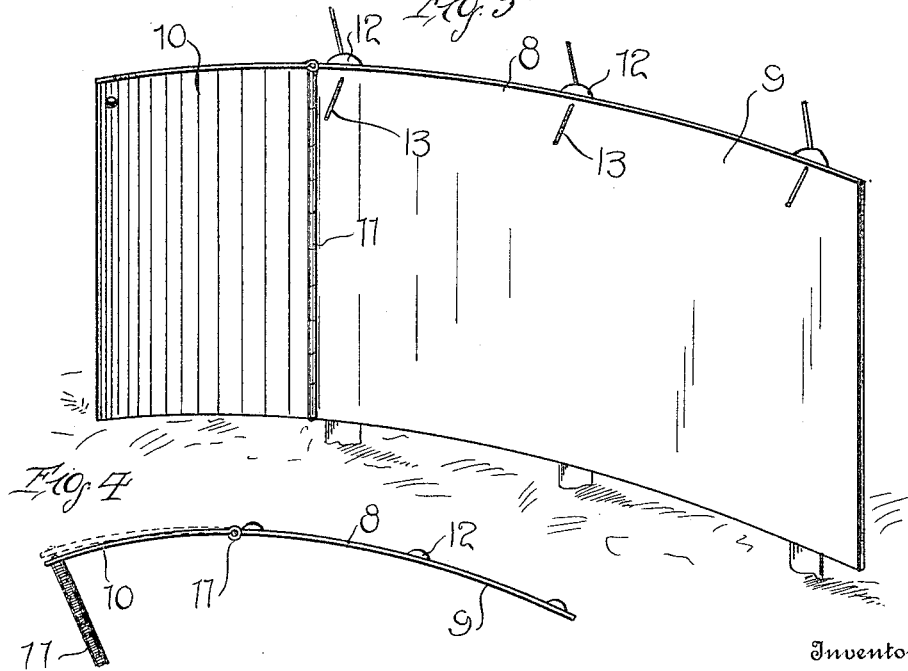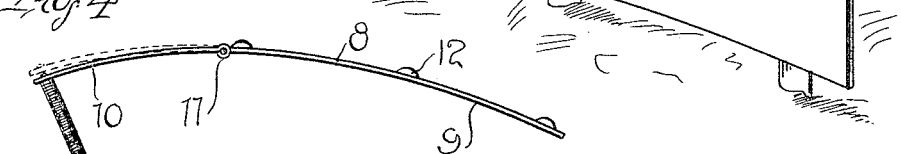

UNITED STATES PATENT OFFICE.

WILLIAM W. CAIN, OF FOWLER, KANSAS.

WIND-WHEEL.

1,127,400.   Specification of Letters Patent.   Patented Feb. 9, 1915.

Application filed November 12, 1913. Serial No. 800,598.

*To all whom it may concern:*

Be it known that I, WILLIAM WARREN CAIN, a citizen of the United States, residing at Fowler, in the county of Meade and State of Kansas, have invented certain new and useful Improvements in Wind-Wheels, of which the following is a specification, reference being had to the accompanying drawings.

This invention relates to new and useful improvements in wind wheels and the primary object of the invention is to provide an improved device of this character having air-directing blades in connection therewith.

A further object of the invention resides in providing air-directing blades, each of which is composed of a stationary and a movable section and a still further object resides in providing yielding means in connection with the stationary section of one blade and the movable section of the adjacent blade.

Still another object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawings forming a part of this application, Figure 1 is a plan view of a device constructed in accordance with my invention, parts thereof being disclosed in section. Fig. 2 is a vertical section therethrough as seen on line 2—2, of Fig. 1. Fig. 3 is a perspective view of one of the blades for directing the air currents. Fig. 4 is a plan view of one of the last mentioned blades showing in dotted lines the movement of the movable section thereof; and Fig. 5 is a detail section through the hub or central portion of the device.

In describing my invention, I shall refer to the drawings in which similar reference characters designate corresponding parts throughout the several views and in which 1 indicates a hub or sleeve-like central section, through which extends a central shaft 2, the latter being suitably mounted through the medium of the bearing balls 3 to the substantially radial arms or supports 4. These radial arms 4 form the main supports for the device, the same being braced by means of the bracing arms 5.

Radiating from the hub or sleeve-like section 1, are the arcuately designed blades 6, the outer edges of which are connected, at their upper and lower ends, by means of the ring members 7, and the hub with the blades and the connecting rings 7 form the rotating wind wheel proper. I have provided, however, a means for the directing of air currents toward the wind wheel and to this end, I provide a plurality of arcuate air-directing blades 8 which are arranged in circular alinement around the wind wheel and each of these blades 8 consist of an outer stationary section 9 and an inner movable section 10, the latter being hinged, as shown at 11, to the aforesaid stationary section. The outer sections 9 are secured in the ground by means of the pillars 12 and the same are further braced one to the other by means of the bracing rods 13 connected to said pillars.

As stated, the inner sections 10 are hinged to the outer sections 9 of the blades 8 and in their normal positions, the sections 10 are designed to form continuations of the arcuate sections 9. In order to normally retain the sections 10 in their normal positions, as continuations of the sections 9, each section 10 is connected at its outer end to the stationary section of the preceding blade by means of a coil spring 14. Thus, when the air currents are directed against the blades 8, and through the medium of the curvature of the latter, directed inwardly toward the blades 4 of the wind wheel, the inner sections 10 of said blades 8 will be flexed against the tension of the springs 14. By providing the yieldable blade sections 10, it will be obvious that heavy wind pressure acting upon said blades will move the same against the action of the springs 14 so that the wind will enter the wheel almost radially thereof and strike the blade 6 at a point adjacent the axis of the wheel. When there is a light wind blowing, however, the angle at which the wind is admitted to the wheel is varied and the wind strikes the vanes or blades 6 adjacent their outer ends, the air current being so directed by the curved blades 9 and 10. Thus a maximum propulsive effort upon the wheel is obtained irrespective of the velocity of the air current.

From the foregoing description of the construction of my improved device, the manner of operation thereof will be readily understood and it will be seen that I have provided an improved wind wheel which is simple and durable in construction, inexpensive to manufacture and one which will be very efficient and useful in operation.

While I have particularly described the elements best adapted to perform the functions set forth, it is obvious that various changes in form, proportion and in the minor details of construction may be resorted to without departing from the spirit or sacrificing any of the principles of the invention.

In view of the peculiar construction of this particular device, it will be seen that the same may be made of greater size than ordinary devices of this character, thus providing a device developing greater power than similar devices in general use.

Having thus described this invention, what is claimed is:—

1. In a wind wheel, a central rotatable member, and a plurality of arcuate air-directing blades surrounding the same, the inner ends of said blades being flexible.

2. In a wind wheel, a rotatable central member, a plurality of arcuate air-directing blades surrounding the same, each composed of an outer stationary section and an inner movable section, and means for yieldingly retaining the movable sections in alinement with the stationary sections of the blades.

3. In a wind wheel, a central rotatable member, a plurality of arcuate air-directing blades surrounding the same, each blade consisting of an outer stationary section and an inner movable section hinged thereto, and means for yieldingly retaining the hinged movable sections in arcuate alinement with the outer stationary sections of the blades.

4. In a wind wheel, a rotatable central member, a plurality of arcuate air-directing blades surrounding the same, the inner portions of said blades being movable, and spring means in connection with the movable portion of each blade and a stationary portion of the succeeding blade to yieldingly retain the movable portions of the blades in arcuate alinement with the stationary portions thereof.

5. In a wind wheel, a central rotatable member, a plurality of arcuate air-directing blades surrounding the same, each blade consisting of an outer stationary section and an inner movable section hinged thereto, and spring means connected to the movable section of each blade and to the stationary section of the succeeding blade to yieldingly retain the movable sections of the blades in arcuate alinement with the stationary sections thereof.

6. In a wind-wheel, a central rotatable member, and a plurality of air-directing blades surrounding the same, the inner ends of said blades being flexible.

In testimony whereof I hereunto affix my signature in the presence of two witnesses.

WILLIAM W. CAIN.

Witnesses:
  ORTIE D. JOHNSON,
  D. E. MARTIN.

Copies of this patent may be obtained for five cents each, by addressing the "Commissioner of Patents, Washington, D. C."